(12) United States Patent
Roberto

(10) Patent No.: US 6,560,921 B1
(45) Date of Patent: May 13, 2003

(54) PROCESS FOR PREPARATION OF BIOCATALYSTS AGENTS; BIOCATALYSTS AGENTS THUS OBTAINED; PROCESS FOR PREPARATION OF ORGANOMINERALS FERTILIZERS DERIVING FROM A WIDE SERIES OF ORGANICAL RESIDUALS; ORGANOMINERALS FERTILIZERS THUS OBTAINED AND A PROCESS FOR APPLYING ORGANOMINERALS FERTILIZERS IN AGRICULTURE

(76) Inventor: Lazaro Sebastiao Roberto, SQ5 205 Bloco E 307, Brasilia-DF, CEP 70235-050 (BR)

( * ) Notice: Subject to any disclaimer, the term of this patent is extended or adjusted under 35 U.S.C. 154(b) by 0 days.

(21) Appl. No.: 09/700,838

(22) PCT Filed: May 27, 1999

(86) PCT No.: PCT/BR99/00048

§ 371 (c)(1),
(2), (4) Date: Nov. 21, 2000

(87) PCT Pub. No.: WO99/61393

PCT Pub. Date: Dec. 2, 1999

(30) Foreign Application Priority Data

May 27, 1998 (BR) .............................................. 9803631

(51) Int. Cl.[7] .............................................. A01B 79/02
(52) U.S. Cl. ...................................................... 47/58.1
(58) Field of Search ................................. 47/48.5, 58.1

(56) References Cited

U.S. PATENT DOCUMENTS

| | | | | | |
|---|---|---|---|---|---|
| 4,871,673 A | * | 10/1989 | Rehm | .......................... | 435/262 |
| 4,888,293 A | * | 12/1989 | Hackl | .......................... | 435/245 |
| 5,102,104 A | * | 4/1992 | Reid | .......................... | 266/168 |
| 6,042,744 A | * | 3/2000 | Nation | ................... | 252/187.23 |
| 6,168,766 B1 | * | 1/2001 | Imai | .............................. | 423/27 |

FOREIGN PATENT DOCUMENTS

| | | |
|---|---|---|
| DE | 19523334 | 1/1996 |
| JP | 57183386 | 11/1982 |
| JP | 60027672 | 12/1985 |
| JP | 8290988 | 11/1996 |
| RU | 2064473 | 7/1996 |

OTHER PUBLICATIONS

PCT Search Report dated May 11, 1999.

* cited by examiner

Primary Examiner—Charles T. Jordan
Assistant Examiner—Francis T. Palo
(74) Attorney, Agent, or Firm—Staas & Halsey LLP

(57) ABSTRACT

Process for preparing biocatalyst agents, including mixing, at room temperature, water with a pH between 2.8 and 3.5, a cofactor including at least one of an oxidant, microorganisms, thiooxidan and ferrooxidans, manganese and manganese sulfate; letting the mixture sit for a period sufficient to form a biocatalyst agent; mixing water, zinc sulfate, copper, sodium molybdate and the biocatalyst agent; letting the mixture sit for a period sufficient to form a fluidic cofactor; adding $HNO_3$, $H_2PO_4$, hydrated lime, and the fluidic cofactor; letting the mixture sit for a period sufficient to form a reacting agent and nutrients mixture; and, while maintaining the pH of the mixture, adding $SO_4NHO_4$ with nitrifying micro-organisms selected from nitrosomonas, nitrobacter, and nitrifican, pseudomonas, micrococcus, spirillum, thiobacillus, and aspergillus; and airing the mixture.

11 Claims, No Drawings

PROCESS FOR PREPARATION OF BIOCATALYSTS AGENTS; BIOCATALYSTS AGENTS THUS OBTAINED; PROCESS FOR PREPARATION OF ORGANOMINERALS FERTILIZERS DERIVING FROM A WIDE SERIES OF ORGANICAL RESIDUALS; ORGANOMINERALS FERTILIZERS THUS OBTAINED AND A PROCESS FOR APPLYING ORGANOMINERALS FERTILIZERS IN AGRICULTURE

BACKGROUND OF THE INVENTION

The object of the invention is the preparation of biocatalyst agents which positively aid the process of digestion and humification processing for obtaining organomineral fertilizers where residual materials are employed, i.e., as from a wide series of organic residuals from urban origin, industrial or agricultural.

Another objective of the present invention is to use the biocatalysts agents herein obtained, being applied in the form of specific compositions. Furthermore, another objective of this invention refers to the process of treatment of residual organic material, being transformed in more productive organomineral fertilizers for use in agriculture.

In this manner, another objective of the invention is to promote a process for preparation of organomineral fertilizer from a wide series of urban organic residual, industrial or agricultural, applying in one of the steps of the process the biocatalyst agent previously mentioned.

The organomineral fertilizers obtained according to the present invention are also considered as organomineral biocatalysts due to the property of improving directly or indirectly the development of plants, hence the productivity of cultures.

The use of organominerals in agriculture constitutes growing practice firstly by the broad dissemination of the effects and advantages caused in the soil and cultures, secondly, cleaning the environment by utilizing these by-products as an alternative source of fertilizers and organic matters, like nutrient elements readily available for plants. However, decades ago these organominerals did not have any stipulated function in agriculture, as no techniques were developed to permit its economic use with more efficiency.

In the whole world, the soil is deteriorating due to a lack of organic material in that when conveniently treated, and applied in agriculture, improves the soil's physical condition, supplying nutrients readily available and stimulates a microbiological activity from the same, therefore creating the same positive effect in agricultural production.

As an example, the organominerals fertilizer utilization can be cited as an application in tomato cultures and cucumber in ALMEIRAS, melons in Sevilha, Spain by COFERT VEFINEX INTERNATIONAL TRADING BV HELMOND HOLLAND Company. In this experiment with tomatoes, a commercial fertilizer rating of 66.6 t/ha was used against 2.8 t/ha of an organomineral. The chemical fertilization raised production about 25% in relation to the treatment not fertilized, while the organomineral was increased around 80%, i.e., 55% more than regular fertilization. Furthermore, the quantity of organominerals used was 23.8 percent less than the chemical fertilizer, therefore reducing cost in the process. In the experiment with the cucumber, three different commercial fertilizing dosages, 30, 45, and 60 t/ha were used, noting an increase of 1 to 6% in relation to treatment of non-fertilized, while the organominerals were utilized in dosages of 1.5, 2.0, and 3.0 t/ha, with increases of 4 to 16% in comparison with non-fertilized (the higher dosage, 3.0 t/ha caused an increase in the lower dosage of 2.0 t/ha). Now in the melon culture, the comparison was made between the commercial fertilizer, a mixture of worms and organominerals, utilizing the dosages of 20 t/ha of the commercial fertilizer, 4 t/ha of the worm mixture and 2 t/ha of the organominerals. The increases, relating to treatment non-fertilized were respectively 12, 14, and 20%. In this manner, the beneficial effect of the organominerals for these cultures was tested, as was a relation to the productivity and the consumption of fertilizers.

Research about the reuse of minerals and various residuals (mineral and organic), like alternative sources of organominerals fertilizers, had its beginning in 1976 through the application of biometallurgy and biotechnology. With the advancement of technology several processes were developed, synthesis and catalysts, for use in raw sewage, urban garbage, filter cake, sugar cane bagasse, vine residues, cow and bull dung, etc.

Some techniques can be analyzed in the document PI BR 8600757, where it shows it is possible to react organic residuals with chemical agents in one reactor, in production of fertilizers totally free of any pathogenic agents.

The patent application PI BR 8402955 discloses compositions of organic and organomineral fertilizers that are water soluble, as well as the process for obtaining them, placing the residual distillation product in contact with phosphoric acid, adding itself to the mentioned mixture of organic solvents, such as lower alcohol and ketones, being precipitated, separated and dried.

All of these processes demand more sophisticated techniques, further demanding better quality raw materials, which raises the cost of the process, and demand higher care in manipulation, aside from requiring separation of the precipitate.

Another question to be highlighted is that the mineral fertilizers, like conventional NPK, are generally treated thermal-chemically. In this way they not only show the micro nutrients, substances incorporated like insoluble salts and non reacted ores, unclean from industrial process and others impure materials, that with the continuation of its use, and its accumulation, it harms the soil and consequently the productivity of its cultures, as previously shown.

SUMMARY OF THE INVENTION

One of the objectives of the present invention includes, therefore, in technologies of producing biocatalyst agents, is the production of organomineral fertilizers based on this, which results in final products which can be applied to the soil to improve its characteristics, having in its formulation organic material promptly available, not only macro and micro nutrients, without causing risks to the environment.

It is known that a decomposition of the organic matter is due to action of microbial biological agents, which need the physical and chemical actions to obtain good quality fertilizers.

It is known that soil with low fertility rate and over use of chemical fertilizers in soil cause an unbalance of organic matter and reduce fertilization, increase the leaching and the acidification of the same. The worst practical cultivation methods result in cationic unbalancing. The lack of compensating for losses of organic substances retards its life and microbial synthesis. The lack of irrigation or excessive irrigation increases hardening of the soil and the burning accelerates the rhythm of destruction of the humic material.

Humic acid is defined as colloids in laboratory level, chelate in suspension within biotechnology process in its application in organic residuals. Although all molds are organic matters, not all organic matters are molds. An organic matter deriving from animals produces soley nitrogen compounds and a few mineral elements. The main source of organic matter for nutrition of plants is from a transformation and synthesis by decomposing microbial-chemicals from the vegetal organic matter in the molds. The mold by definition is a matter of dark color that presents a very fine structure and completely mixed with the mineral matter from the soil, having colloid properties. It is a complex substance formed by organic compounds from the decomposition of vegetable waste, which is transformed under action of the microorganisms.

The active compounds derived from degradation and decomposing of organic matter suffer microbial synthesis forming real humic acids, that are considered an active matter of molds. These humic substances are naturally found in the soil, in very low contents. The humic substances are organic alloys that resist microbes and therefore can be called "Permanent Molds", partaking to the enrichment of the soil.

We know that, depending on the type of soil, the humic substance represents from 0.5% to 1.5% of the total organic matter. Therefore the importance of having an extra source of supply of the active matter is very important to the biochemical balance of the soil to improve its conditions and the nutrition of the plants, which is one of the objectives of the present invention.

Although known for many years, the commercial production of humic acid for its use in agriculture was limited until recently by the high cost of extraction. Today's modern techniques permit obtaining same in high quantity and highly concentrated, making it possible for its commercialization at a high cost to the farmer.

Aside from its extraordinary fertilizing properties, its use should be parallel to a set of cultural techniques suitable to modern culture, permitting large quantities and high concentrations, making possible its commercialization at a lower cost to the farmer, permitting:

Suitable soil preparation

Mineral fertilization that is balanced and rationalized

Regular control of the soil by analyzing the ground and foliage.

One of the objectives of the present invention is the application of humic acids of synergic action in the organomineral fertilizer that maximizes benefits, results and the profitability of mineral fertilization. Aside from that, furnishing with its use organic substances that activate the important functions for the fertility of the soils and development of the plants is a goal.

In the same way mineral fertilizer manufacturers raise the concentration of fertilizers to limit its maintenance and costs of the application, the organic maintenance of the soil should follow the same principals with the application of humic acids.

The present invention provides, through the presence of the humic acid in the organomineral fertilizers, the balance, which is essential to all agronomic practice. The humic acids act in conjunction with this balance, to maximize the bio-medication of the soils.

In order to evaluate the aim of the present invention some uses of the mold should be considered.

The humic acids are complex organic molecules, of high molecular weight, formed by the decomposition of organic matter; are colloids and behave in a certain manner like argils even though they are classified as acids and form real salts. When the place of cation exchanges in the humic molecule are filled with hydrogen ions, this material is considered acid meanwhile there is no big affect in the pH, because the acid is insoluble in $H_2O$. When the predominant cations are different, not being the H+, the material is considered as an ester of humic acid. The alkaline metal humic acid esters are water soluble, and the multivalent metals are insoluble.

The humic acids also change the metabolism of the carbohydrates, promoting an accumulation of sugar reducing agent. Under anaerobic conditions, it makes iron available to the roots.

The chelating mechanism of the humic acids is responsible for the intensity of the color of the plants, and the mobilization of the phosphate improves root development.

The humic acid esters avoid the immobilization of iron, phosphorus and others, raising the availability of these for plants, facilitating a displacement of these elements, from the root to the stem, causing a cationic balance.

Cationic balancing of the soil and its integration is illustrated by the following description:

1. Ratio→humic acids/fulvic adds and humic acids/total carbon
2. Humifcation rate=(fulvic acids+humic acid+humic acid amine)/total carbon.

Each one of the humic compounds has different tasks; some react in nurturing plants and microbial lives and others react in the structure of the soil. The humic acid appears to have the capability to release carbon dioxide from the calcium carbonate from the soil and make them available to plants, through roots to photosynthesis. The carbohydrates are the main source of energy from the micro-organisms.

Fulvic acids have the capacity of forming a soluble complex in water with metal ions, di- and tri-valents, greatly facilitating the movement of these ions inside the plants.

In the following, humic acid actions are highlighted.

As far as plants are concerned:

Stimulates the rooting and prevents collapse due to replanting "chock" and, help the plants to withstand the stress caused by attacks and chemical controls of plagues and illnesses of the plant.

Stimulates the development and production through the significant increase of the root system:

Increases green mass formation

Improves constancy, aspect and strength of the plants

Intensifies the color of the leaves, flowers, and fruits, improves the quality, size and mainly the flavor maintenance and increases store life and, as a consequence, a correct balancing of the organomineral.

As far as action of the same on the soil:

Avoids erosion through the increase of the bio-structure of the soil;

Improves soil preparation and increases resistance to drought by the increase of retention and hydric absorption of the same.

Reduces soil temperature, producing particles of adequate size for stable formation aggregates;

Reduces leaching of the mineral fertilizers and retains unsoluble organic nutrients, releasing to plants when necessary;

Binds chelating nutrients and rare elements and oligoelements, releasing them to plants;

Releases nutrients held in soil and accelerates its displacement from the roots to the plants (mainly P);

Regulates and raises stability of pH in soils;

Protects plants against high concentration of sodium and mineral salts in the soil.

The technology of this invention has the aim to provide all these advantages, through the utilization of organomineral fertilizers, herein developed.

Therefore, the objective of this invention is an organomineral fertilizer, when consumed, solubilized and with the incorporation of nutrients via biological induction, besides having as a main differentiation making use of organic and inorganic wastes, obtained from residual recycling, and besides the incorporation of micro-organisms, proportioning an average for high concentration of macro and micro nutrients, having the remainder of its formulation consisting of organic matter promptly assimilated.

The objective of this invention includes leading several residuals to an economic utilization, avoiding, in this manner, a contamination of the environment withstood till now, and to provide valuable products and, above all, providing agents with potential fertilizer action and composition based therein.

Therefore, this invention permits the utilization of organic residuals for renowned reasons, such as production of bio-fertilizers of high agronomic value, totally compatible with an organic agriculture and supportive, organic and inorganic residuals frequently causing large environmental damage, such as domestic orgariic garbage, liquor from compounding of urban garbage, sewage residuals and industrial inorganic residuals.

The present invention presents a technical interference of high social and ecological disclosure, when it uses alternative sources of diversified residuals, like raw material for production of organomineral fertilizers. Examples of recycled residual by the present invention are: saw dust, cellulose resin, swine resin, sewage slush, urban garbage, filter cake Olivier, sugar cane bagasse, husks of grapes, cow and bull dung, by-products of sugar and alcohol refiners, amongst others.

Its known that a decay or decomposition of organic matter depends on perfect control of the variables, proportioning the catalytic activity of the micro-organism present, permitting maturity of the product, through the determination of total carbon (C) and oxidizable, nitrogen (N) and ammonia ($N_2$) and perfect ratio C/N, which shall be inferior to 12/1.

Suitably, this invention includes using several micro-organisms, provided with specific cofactors and basic substrate with active amino acid synthesis that cause the reduction of cellulose and carbons besides activating a solubility of minerals causing a substantial increase of macro and micro nutrients in the conservative reaction medium.

The great advantage of technology brought by this invention includes applying the biocatalyst agents in a process of obtaining organomineral fertilizers aiming to accelerate the bio-digestion process (digesting and humification) in a scale of 3 to 48 hours reaching an 85% average of transformation of a diversified organic residual, promoting the reduction of carbon and lignicellulosic elements within the required parameters.

Therefore, one of the main aspects of the invention includes preparing the biocatalyst agents to be utilized in accelerating of the bio-digestion of organic residual in a process of acquiring organomineral fertilizers.

A great advantage of this invention includes the combination of micro-organisms of the oxidation and thioxidation in a specific medium with a determined pH and with addition of cofactors and acceleration of the synthesis and induced active amino acids.

DETAILED DESCRIPTION OF THE PREFERRED EMBODIMENTS

The process of this invention includes reaching a reduction of carbon, from the lignicellulosic elements, an accelerated humification mass, an oxidation and bio-leaching of minerals and inorganic elements and nitrification of the mixture through the utilization of 3 catalytic forms.

Consequently, one of the objectives of the present invention is a process for the preparation of biocatalyst agents, including:

Catalyst 1: catalyst containing amino acids with pH between 2.8 and 3.5

Catalyst 2: catalyst containing oxidants and thiooxidans to form an energy field airing, in which the specific medium contains:

NAD, ATP, ADP=culture medium

Oxyreduction: NAD/BI with $T_2NO_3$

NAD/Bl with $T_3NHC_4$

NAD/Cl with $T_4NH_2SO_4$

Catalyst 3: nitrifying catalyst comprised by microorganisms such as: Pseudomonas, Micrococcus, Spirillum, Thiobacillus, Nitrosomonas, Nitrobacter, Aspergillus in liquid organic culture form, which conditions of development are:

$NH_4 + 1.5\ O_2$ Nitrosomonas→$NO_2 + H_2O + 2H$+energy $NO_2 + 0.5\ O_2$ Nitrobacter→$NO_3$+energy $RCHNH_2COOH$ Aspergillus→$RCH_2COOH + NO_3$ In the elaboration of biocatalyst agents occurs a precipitation form, through the airing of the culture medium, utilizing a fluid agent. This culture medium is formed of active elements in a time frame from 12 to 72 hours. Also occurring is an amino acid synthesis that will react upon the nutrition of active principals that will do the task of breaking the cellulose and lignin of the sources of carbon for its digestion.

The process of preparation of biocatalyst agents includes:

a) Catalyst 1: Add 85.3 liters of water in a 100 liter vessel with an adjusted pH of 2.8 to 3.5, at room temperature, the correction being made with 250 ml of $H_2SO_4$, 0.025%+0.015% from a cofactor containing microorganisms of the type *Thiobacillus thiooxidans* and *Thiobacillius ferrooxidans*, in self acceleration medium, utilizing itself like a substrate, 125 grams of manganese oxide, 250 grams of manganese sulfate, 2,500 grams of urea, 150 milliliters of cofactor, completing the solution with water up to 100 liters and letting it sit for 12 hours.

b) Catalyst 2: In another 100 liter vessel add 90 liters of water, with corrected pH between 2.8 to 3.5, 125 grams of zinc sulfate, 125 grams of copper sulfate, 125 grams of sodium molybdate and 9.43 liters of the biocatalyst agent obtained in step "a", leaving it for a time frame of 12 hours and topping the 100 liter recipient with water.

c) Catalyst 3: In another 100 liter recipient add 92 liters of water, 750 milliliters of $HNO_3$, 1500 milliliters of $H_2PO_4$, 5 kilos of hydrated lime, 250 milliliters of fluid cofactor, leaving it for a time frame of 12 to 24 hours and topping the 100 liter recipient with water.

d) Catalyst 4: After 24 hours transfer the reacting agents and nutrients of steps "a", "b" and "c" to another recipient with the capacity of 1.000 liter, verifying the pH of the same and adding 7.5 kilos of $SO_4NHO_4$ completing the recipient with water and correcting with $H_2SO_4$ equivalent to a concentration of 0.05%, 2.5 liters of the fluid agent, with nitrifying micro-organism: Nitrosomonas 0.025%, Nitrobacter 0.015%, Nitrificans 0.010%, and promoting airing every 30 minutes by injecting oxygen for a period of 5 minutes.

Thus were obtained 4 types of biocatalysts. The deployment follow the same criteria of manipulation in consideration to chemioautotrofic nitrifying which utilize ammonia or nitrite, or being:

Nitrosomonas/Asobacter:

$$2NH_3+6O_2=energy \rightarrow 2NO_2+O_2+2HO_2+2HO_2$$

with nitrose synthesis up to 25% and nitrification up to 25%.

According to another objective, the present invention consists in application of one or more catalytic fluid (biocatalyzing agents) obtained according to previous techniques in digestion and accelerated molding of residuals from the slush, organic garbage, animal dung and others, in a time frame from 3 to 48 hours, attaining an average of 85% of transformation of these residuals, and promoting the reduction of carbon and lignicellulosic elements, within the required parameters.

Another objective of the present invention is to promote a process to prepare organomineral bio-fertilizers as from a wide series of urban, industrial or agricultural origin organic residues employing one of its stages the bio-catalyst agents above mentioned.

The preparation process of the organomineral fertilizer, in accordance with the present invention, involves in the basic form the following steps:
  a) sterilization of the material to be treated, naturally through a combination of pH factors from 0 to 3.5, at room temperature with reaction time from 3 to 72 hours, eliminating the pathogenic agents and bad odor;
  b) submit the recently formed organic mass to reaction of bio-digestion with one or more biocatalyst agents obtained in accordance with the established process for catalyst solutions 1, 2, 3 and 4, resulting in an acceleration of bio-digesting (digesting and molding) from 3 to 48 hours reaching an average temperature of 80° C. in the presence of larva that cause a break and reduction in the carbon chain and lignicellulosic elements.
  c) Make the solubility of the organic mass obtained in step (b) by adding nutrient sources, like 35% saw dust, 15% chicken dung, 21.25% of natural phosphate and 21.25% of phospho-gypsum;
  d) If necessary, balancing of nutrients after step (c) through the addition of macro and micro nutrients contained in the traditional agronomic lines, that suffered new biological synthesis passing from inorganic form to organic form.
  e) Separation and cure in a period of 24 to 72 hours.
  f) Granulation of the material obtained in step (e) in mixers and vibrating sifters acquiring the organomineral fertilizers with an ideal particle size for application in the field in the form of granules, crumbs and powder.
  g) The obtained material from step (f) can be diluted in water where through the process of centrifugation occurs an extraction of a organomineral fertilizer in the liquid form.

The liquid organomineral fertilizer obtained in item (g) above contains the same properties as solid organomineral fertilizer and should be applied in layers during a cycle of cultures and dilutions that vary from 0.5 to 5% depending on the agronomic recommendations.

A selection of biocatalyst agent 1, 2, 3 and 4 to be used will depend on the type of raw material utilized. As for step (d), depending on soil analyses a suitable product balance is promoted through the determination of quantity of necessary macro and micros nutrients for a given culture.

It is the objective of this invention also to furnish an organomineral fertilizer obtained in accordance with the process of the invention constituting its active base for the formulation of the composition.

The relative quantity of composition components is regulated according to the grade of compounds, aside from the content of desired minerals for the composition itself.

A preferred embodiment for the composition of this invention without any limitations, is that which uses orgamineral fertilizer based on 7.5% of the biocatalyst agents; 35% saw dust, 15% chicken waste, 21.25% natural phosphate and 21.25% phospho-gypsum.

The organomineral fertilizers obtained by this invention are agronomically feasible, have their applicability in several cultures of the field, show a balanced group between the organic residuals, which after its mineralization results in organic matter readily digested adding to natural mineral sources where macro and micro essential elements are available biologically that go from an inorganic form to an organic form. Furthermore, it shows a complex of beneficial micro-organisms interacting with the soil thus causing a great increase of the meso and micro fauna.

As the main characteristics of organomineral fertilizers of this invention, it can be noted the proportional increase of the organic matter perfectly assimilated, relation C/N of 9/1 and nutrients in balanced quantities. As a remark, the used nutrient sources do not contain any salts that are harmful to the irrigation system or the plants.

The process for applying organomineral fertilizers based on biocatalysts agents makes it known through the direct application in the form of granule, liquid, powders or crusts in agriculture, in several types of cultures within the specific suitable ranges, aiming the biological recovery of the soil caused by nutrients and organic matters, readily available.

Particularly, the organomineral fertilizer can be applied in soy and corn cultures in an area of 450 to 750 kilograms per hectare.

For coffee cultures it is possible to apply the organomineral fertilizer of the invention ranging from 1,200 to 2,500 kilograms per hectare.

The experimental samples and demonstrations in the field ahead are illustrations and not limitations of this invention:

EXAMPLES

Example 1

(Biocatalyst Preparation)

$NH_4+1.5\ O_2$ Nitrosomonas—$NO_2+2H$+energia $NO_2+0.5$ Nitrobacter–$NH_3$+energy $RCH_2COOH+NO_3$ using micro-organisms, including Pseudomonas, Mirococcus, Spirillum+ Organic Substances and others, and electron donors reducing rapidly the nitrate which is converted to nitrite or hyponitrite and after $N_2CN_2$ nitrate is reduced to ammonia by a single enzyme and nitric reductase, a brown enzyme, with a molecular weight of 64,000, containing sulfur labial (sulfate) and two atoms of Fe being not Hemi $NO_2+3$ $NADH+SH+NH_4+3NAD+2H$: Glutamic amide acid plays a major part in the embodiment of ammonia in organic compounds where it is necessary to air it out every quarter hour for a period of 2 minutes.

Example II

Experiments of treatment of alternative sources for production of solid and liquid organomineral fertilizers and substrate for production of sprout (coffee mainly) in accordance with the present invention, utilizes urban garbage, liquor from compounding, sewage slush, residuals from fertilizer industry, remains from vegetable and fruit markets, coffee bean shell, rice stalks and sawdust, all easy to obtain and or abundant in the Minas Gerais Triangle, specially Uberaba.

During its initial phase, other raw-materials were used for production of co-factors, thus being: coffee bean shell, pine sawdust, rice shell, agricultural pines, agricultural gypsum, phosphate rock, verdigris, sulfur sludge, fruit and vegetable remains. These materials were submitted to laboratories to be analyzed before and after biological treatment. During the process of extraction of cofactors, fungus colonies, bacteria and afterwards, larva, were developed. Ending the process of biological extraction, a liquid portion was set apart from the solid portion, and from there, a product was obtained, whereof nutrients were assessable in order of the percentage of established extraction (0.25; 0.50; and 0.75).

To acquire the organomineral fertilizer of the invention, in agricultural use, it is necessary to verify the nutrient levels of the product, through chemical analysis. This is due because there is no set standard of nutrients as raw material, even being from the same source. A complementation or balancing of nutrients is done accordingly with the proportions available in the organomineral fertilizer and the soil and culture necessities. Establishing the nutritional balancing, the quantity to be applied in a given culture is calculated in a given soil. In the table below are shown the analytical results of the raw material and products resulting from such, before the nutritional balancing, in which reflects the results of the present invention.

Table 1

Analytical result of the products (solids and liquids) generated through sawdust, urban garbage, liquor from compounding and respective modifications in the contents of nutrients by the applied treatment.

Table 2

Physical-chemical composition of the organomineral fertilizer and raw-materials (garbage and phosphate rock) 1997.

Table 3

Physical-chemical composition of the organomineral fertilizer and raw material (sawdust, gypsum and phosphate rock) 1997.

The results of the experiments of the present invention can be analyzed by the results of maturity of products shown in table 1, where it is observed that, within the nutrients available in the treated raw-materials, the calcium, magnesium and the sulfur stands out showing an increase in addition to organic C, which showed a considerable reduction in its content, which made it possible to reach more adequate and compatible values with the present legislation relating to C/N.

Also it is convenient to point out the effect of the applied treatment in the availability of iron. In raw garbage the content of this element is of 15,950 ppm (parts per million); after treatment, this content was reduced to 3.3 ppm, i.e., it had a drastic reduction in availability, eliminating a possible intoxication of the plants. The application of the biological treatment provided, furthermore, an availability of micro elements like boron, copper and molybdenum, not present in untreated materials in an acceptable form by plants and or detected in chemical analysis.

An evaluation of maturity of the products as to N, P, and K is shown in table 2. From the data in this table, it is verified that the process of bio-technological transformation applied in raw materials (garbage and phosphate rock) had a proportional increase of 958% in the concentrations of N, 111% in the total P, 490% in phosphorus soluble in citric acid and water, 702% in concentrations of K, aside from considerable increases in Ca, S, and micro nutrients.

Making a comparison of the produced fertilizers, in relation to formulated commercial fertilizers, the proportion of nutrients made available in the contents of garbage+phosphate rock (table 2) corresponds to the form N/P/K=6.3/4.5/1/2+Ca+S+micro-nutrients. Considering a 30% efficiency minimum, this form would correspond to N/P/K=8.2/5.9/1.7+Ca+S+micro-nutrients+organic matter readily available. The concentration of NPK can be doubled depending on the quality and balancing of the catalysts.

In case of using sawdust, gypsum, rock phosphate as raw-material for the production of organominerai fertilizers of this invention, it is verified that the process of bio-technological transformation applied to the raw-materials, proportioned increases of 2,658% in concentration of N, 214% in total P, 710% in phosphorus soluble in citric acid and water and 3,986% in K, aside from considerable increases in S, Ca, and micro-nutrients. From these sources was produced an organomineral fertilizer corresponding to a N/P/K=4.4/4.6/1.1+Ca+S+micro-nutrients. Considering a minimum of 30% efficiency, this fertilizer would correspond to a form N/P/K=5.8/4.6/1.4+Ca+S+micro-nutrients+organic matter readily available. However, depending on the quantity and balancing of the catalysts, the concentration of NPK could still be doubled.

It is possible to confirm that economically, comparing cost of the organomineral fertilizer against commercialized chemical fertilizers, a reduction of 30% for the first is obtained, that makes such products more economically feasible to farmers aside of having an advantage of not polluting the environment.

These advanced techniques permit acquiring a 100% natural fertilizer, with high standards, hygiene and is homogeneous.

Example III (Demonstrative of Application of the Fertilizer in the Field for Certain Cultures)

Illustrative sample on the application in the field of the composition organomineral fertilizer, i.e., in agriculture. For utilization of the organomineral fertilizer a few cultures were chosen, demanding highly on nutrients, such as melon, mango, watermelon, coconut, pineapple, cherimoya, sapodilla fruit and passion fruit. As the culture where organomineral fertilizer was used on a major scale, some considerations will have to be made about the cultivation of melon:

The melon was cultivated in a very argil soil, hard to work with, due to its dryness and humidity, probably the presence of argils of high activity, from Vale do Jaguaribe in Russas (CE).

These soils during the drought with use of irrigation permits up to four cultivations per year, with chemical fertilization and irrigation. The fertilization used was based on 4 t/ha/cultivation (fertilization of plantation: 2.5 t/ha/+0.75 t/ha in the first layer and 0.75 t/ha in the second layer), beside the 50 $m^3$/ha of stable dung (bull/cow or caprine). The drawback of using dung as an organic fertilizer is the infestation of weed, illness and plagues, mainly the nematoid worms, aside from the large quantity of sand. On the other hand, the exploitation of the dung is very small, around only 14%, due to conditions in which the dung is applied, that is before it becomes hard, what demanded a time superior than that of melon culture (65) days for releasing of constituents utilized by plants. Another problem detected in this culture, is related to irrigation. The unsoluable salts present in the chemical fertilizers used to accumulate in the surface of parterre of the plantation reaching many times a strip of 15 centimeters wide. The variation of water levels in Jaguaribe River in dry season, causes a crust of salts (frequently in surfaces of the soil in the arid regions) in its margins. During this period, the flood gates of the dam Orós are open, to compensate the low flow of the river, that causes the dragging of the salts accumulated in the margins, damaging the irrigation system, clogging up the nozzles and causing poisoning and burning of the plants. These problems cause a reduction of production which leads the farmers to increase dosages of chemical fertilizers expecting to increase production, for example: 2.0 t/ha of formula 10-10-10+500 kg/ha of simple super phosphate; 750 kg/ha in the first layer, being 500 kg of 10-10-10+250 kg of MAP; and 500 kg/ha in the second layer, being 200 kg of potassium sulfate+200 kg of calcium nitrate+100 kg of ammonia sulfate, around 75 liters of a solution of micro-nutrients via fertilization and irrigation. This procedure aids in a decay of the soil, giving opportunity to test the organomineral fertilizer of the invention, acquired by the steps of sterilization, digestion, solubilization, and nutritional balancing.

With the application of the organomineral fertilizer of this invention, starting from the second cultivation, its advantages become evident in biological structure of the soils detected through the Fertility Indication Acquired (IFA). For determination of IFA, macro and microscopic observations were made, identifying itself as macro and micro fauna of the soil encompassing the root system (this parameter brought a more accentuated attention to the macroscopic level), aside from the chemical analysis from the soil and plant. Still noted was a reduction of illness despite the diminishing number of spraying (from 10 to 12 passed, in the maximum 3 sprays) and a regular productivity with good fruit quality. The used formulation followed an agronomic recommendation and the requirements of hybrid species: Gold mine, Mellody Gallia, and non hybrid species like Cantaloupe and Orange Fresh. In this way, the quantity of additional nutrients added through the organomineral were:

Foundation (Plantation=2500 Kg/ha of organomineral 10-12-10+Ca)

$1^{st}$ Layer=750 kg/ha of 04-10-16+Ca+micro-nutrients $2^{nd}$ Layer=750 kg/ha of 02-06-10+Ca+micro-nutrients Beyond the advancement in a very argil soil, chemically rich, but with serious problems deriving from undesirable physical characteristics, it was decided to re-structure the extremely sandy soil (Quartz sand), chemically poor, acidic arid, in Touros Region (RN), just 24 km in direction of the interior.

Although the texture and fertilization of this soil were different than before (rougher texture and lower fertility), melon products adopted the same recommendations and practices of handling of another area. The proposal for utilization of organomineral of this invention in this type of soil, had as its general objective to raise and maintain the production of melon, obtaining the fruits in a set standard for export. Therefore, the specific objects were different.

While the very argil soil, hard to work with in the dry season and unfeasible rainy season, was meant to minimize this difficulty facilitating the execution of the cultivation in terms of better physical characteristics of the soil, in sand the main objective was to produce a fertilization and soil structure, once the physical problem was smaller.

In initial phases, the problems met resumed in terms of location of fertilizer in plantation trenches, which showed inefficiency, using the same handling adopted for argil soil. As from the unsuccessful first cultivation, some adjustments were made, placing the organomineral closer to surface, therefore, almost in immediate contact with a root system. The fertilizer placed deeper was easily leached staying out of reach of the roots which barely developed; once more it had no hydric deficit. Adjustments made, it reached desired productions (40 to 42 t/ha) within standards established for export, which turned out to be more feasible, nutritional and economical than the conventional system.

Before success with melon culture in these two different environments, the organomineral fertilizer of the invention was successfully used in other cultures: mango, watermelon, coconut, pineapple, cherymoya, sapodilla and passion fruit, in other regions of Rio Grande do Norte, Piaui, Ceara and Bahia. In the latter state, the organomineral fertilizer of the invention was utilized in a large state in the culture of mango, passion fruit and coconut.

Having accumulated this experience with fruitful species in the Brazilian northeast, it was decided to look for alternatives to scientific evaluation of the product.

TABLE 1

Physical-Chemical Composition of organomineral fertilizer and raw material (garbage and phosphate rock). 1997.

| Composition | M.O. % | C/N | N % total (%) | $P_2O_5$ solub. (%) | $P_3O_5$ imob. (%) | $P_2O_5$ (%) | $K_2O$ (%) | Ca (%) | S (%) | B (%) | Zn ppm | Mn ppm | Mo ppm | Co ppm | Cu ppm |
|---|---|---|---|---|---|---|---|---|---|---|---|---|---|---|---|
| Garbage | 22 | 18 | 0.68 | 0.30 | 0.30 | 0.00 | 0.17 | 1.20 | 0.10 | 152 | 103 | | | | |
| Rock phosphate | | | | 25.00 | 4.00 | 21.00 | | 24.00 | | | | | | | |
| Mixture composition* | 19 | 16 | 0.60 | 3.39 | 0.76 | 2.63 | 0.15 | 4.05 | 0.09 | 133 | 90 | | | | |
| AFTER-TREATMENT COMPOSITION | | | | | | | | | | | | | | | |
| Solid | 30 | 5 | 4.88 | 6.93 | 4.30 | 2.63 | 0.78 | 9.32 | 6.35 | 170 | 530 | 620 | 240 | | |
| Liquid (375 l/t) | 2 | 1 | 3.78 | 0.59 | 0.53 | 0.06 | 1.10 | 0.32 | 3.07 | 25 | 62 | 35 | 150 | 10 | 75 |
| Per produced ton | 31 | 5 | 6.30 | 7.15 | 4.50 | 2.65 | 1.19 | 9.44 | 7.50 | 179 | 553 | 633 | 296 | 4 | 28 |
| VARIATION BETWEEN ORIGINAL RAW MATERIAL AND TREATED RAW MATERIAL | | | | | | | | | | | | | | | |
| Solid | 159 | 1058 | 211 | 590 | 101 | 802 | | 233 | 8573 | 416 | 702 | | | | |
| Liquid | | 59 | 958 | 111 | 490 | 1 | | 702 | 133 | 8473 | 316 | 602 | | | |

*1 Mixture Composition 87,5% Garbage + 12.5% phosphate rock.

TABLE 2

Physical-Chemical Composition of organomineral fertilizer and raw material (garbage and phosphate rock). 1997.

| Composition | M.O. % | C/N | N % | $P_2O_5$ total (%) | $P_2O_5$ solub. (%) | $P_2O_5$ imob. (%) | $K_2O$ (%) | Ca (%) | S (%) | B (%) | Zn ppm | Mn ppm | Mo ppm | Co ppm | Cu ppm |
|---|---|---|---|---|---|---|---|---|---|---|---|---|---|---|---|
| Garbage | 22 | 18 | 0.88 | 0.30 | 0.30 | 0.00 | 0.17 | 1.20 | 0.10 | | 152 | 103 | | | |
| Rock phosphate | | | | 25.00 | 4.00 | 21.00 | | 24.00 | | | | | | | |
| Mixture composition* | 19 | 16 | 0.60 | 3.39 | 0.76 | 2.83 | 0.15 | 4.05 | 0.09 | | 133 | 90 | | | |
| AFTER-TREATMENT COMPOSITION | | | | | | | | | | | | | | | |
| Solid | 30 | 5 | 4.88 | 6.93 | 4.30 | 2.63 | 0.78 | 9.32 | 6.35 | 170 | 530 | 620 | 240 | | |
| Liquid (375 t/l) | 2 | 1 | 3.78 | 0.59 | 0.53 | 0.06 | 1.10 | 0.32 | 3.07 | 25 | 62 | 35 | 150 | 10 | 75 |
| Per produced ton | 31 | 5 | 6.30 | 7.15 | 4.50 | 2.65 | 1.19 | 9.44 | 7.50 | 179 | 553 | 633 | 296 | 4 | 28 |
| VARIATION BETWEEN ORIGINAL RAW MATERIAL AND TREATED RAW MATERIAL | | | | | | | | | | | | | | | |
| Solid | 159 | 1058 | 21.1 | 590 | 101 | 802 | 233 | 8573 | 416 | 702 | | | | | |
| Liquid | 59 | 958 | 111 | 490 | 1 | 702 | 133 | 8473 | 316 | 602 | | | | | |

*1 Mixture Composition: 87.5% Garbage + 12.5% phosphate rock.

TABLE 3

Physical-Chemical Composition of organomineral fertilizer and raw material (sawdust, gypsum and phosphate rock). 1997.

| Composition | M.O. % | C/N | N % | $P_2O_5$ total (%) | $P_2O_5$ solub. (%) | $P_2O_5$ imob. (%) | $K_2O$ (%) | Ca (%) | S (%) | B (%) | Zn ppm | Mn ppm | Mo ppm | Co ppm | Cu ppm |
|---|---|---|---|---|---|---|---|---|---|---|---|---|---|---|---|
| Sawdust | 22 | 186 | 0.22 | 0.07 | 0.07 | 0.00 | 0.03 | 0.20 | 0.03 | | 169 | 66 | | | |
| Gypsum | | | | 1.80 | 1.80 | 0.00 | 0.03 | 6.00 | 8.90 | | | | | | |
| Rock phosphate | | | | 25.00 | 4.00 | 21.00 | | 24.00 | | | | | | | |
| Mixture Composition* | 17 | 140 | 0.17 | 3.40 | 0.78 | 2.63 | 0.03 | 3.90 | 1.14 | | 127 | 50 | | | |
| AFTER-TREATMENT COMPOSITION | | | | | | | | | | | | | | | |
| Solid | 48 | 9 | 3.01 | 9.77 | 4.35 | 5.42 | 0.66 | 8.35 | 4.05 | 160 | 510 | 890 | 260 | 35 | 143 |
| Liquid (375 l/t) | 2 | 1 | 8.13 | 0.59 | 0.53 | 0.06 | 0.74 | 0.32 | 3.07 | 25 | 62 | 35 | 46 | 9 | 36 |
| Per produced ton | 49 | 9 | 5.31 | 9.99 | 4.55 | 5.44 | 0.94 | 8.47 | 5.20 | 169 | 533 | 903 | 277 | 38 | 157 |
| VARIATION BETWEEN ORIGINAL RAW MATERIAL AND TREATED RAW MATERIAL | | | | | | | | | | | | | | | |
| Solid | 294 | | 2758 | 314 | 810 | 207 | 3571 | 267 | 19814 | | 261 | 1464 | | | |
| Liquid | 194 | | 2658 | 214 | 710 | 107 | 3471 | 167 | 19714 | | 261 | 1464 | | | |

*1 Mixture Composition: 75.0% sawdust + 12% gypsum + 12.5% phosphate rock.

What is claimed is:

1. Process for preparing biocatalyst agents, comprising the steps of:
   a) mixing, at room temperature, water with a pH between 2.8 and 3.5, a cofactor including at least one of an oxidant, micro-organisms, a thiooxidan, a ferrooxidan, manganese,
   b) letting the first mixture sit for a period of about 12 hours;
   c) mixing water, zinc sulfate, copper, sodium molybdate and the first mixture to form a second mixture;
   d) letting the second mixture sit for a period sufficient to form a fluidic cofactor;
   e) adding $HNO_3$, $H_2PO_4$, hydrated lime, and the fluidic cofactor to form a third mixture;
   f) letting the third mixture sit for a period of about 12–24 hours;
   g) while maintaining the pH of the third mixture, adding $SO_4NHO_4$ with nitrifying micro-organisms selected from the group including nitrosomonas, nitrobacter, and nitrifican, pseudomonas, micrococcus, spirillum, thiobacillus, and aspergillus to form a fourth mixture; and
   h) airing the fourth mixture to form the biocatalyst agent.

2. The process for preparing biocatalyst agents according to claim 1, wherein the thiooxidan is *Thiobacillus thiooxidan* and the ferrooxidan is *Thiobacillus ferroxidan*.

3. The process for preparing biocatalyst agents according to claim 1, wherein the relative concentrations selected in step (g) are 0.025% nitrosomonas, 0.015% nitrobacter and 0.010% nitrifican.

4. Biocatalyst agents prepared in accordance with the process of claim 1.

5. Process for preparation of an organomineral fertilizer, comprising the steps of:
   a) sterilizing an organic raw material to eliminate pathogenic agents and unwanted odors, to form an organic matter;
   b) submitting the organic matter to the biocatalyst agent obtained according to claim 1, to accelerate a bio-digestion reaction from 3 to 48 hours, reaching an average temperature of about 80–85° C., in the presence of larva, and promoting the reduction of the carbon chain and lignicellulosic elements of the organic matter to form an organic mass,
   c) solubilizing the organic mass by adding nutrient sources selected from the group including sawdust, chicken waste, natural phosphate and phospho-gypsum to form an organic material in solution;

d) separating and curing the organic material; and e) forming the organic material obtained in step (d) into an organomineral fertilizer with a particle size suitable for use in the granulated, crumb or powder form in the field.

6. Organomineral fertilizer prepared in accordance with the process of claim 5.

7. An organomineral fertilizer, comprising 7.5% of the biocatalyst agent prepared in accordance with the process of claim 1, 35% saw dust, 15% chicken waste, about 21% of natural phosphate and about 21% of phospho-gypsum.

8. Process for applying an organomineral fertilizer, prepared in accordance with claim 5, in agriculture, comprising the step of:

applying the fertilizer directly to a crop field in a granulated, powder or crumb form.

9. Process for applying an organomineral fertilizer in agriculture according to claim 8, wherein the fertilizer is applied to one of soy and corn fields at 450 to 750 kilograms per hectare.

10. Process for applying an organomineral fertilizer in agriculture according to claim 8, wherein the fertilizer is applied to coffee fields at 1,200 to 2,500 kilograms per hectare.

11. Process for applying an organomineral fertilizer in agriculture according to claim 8, wherein the fertilizer is fluidized and is applied in dilutions ranging from 0.5% to 5%.

* * * * *